Oct. 17, 1950     J. WEST, JR., ET AL     2,526,101
PRIMARY DRY CELL
Filed March 16, 1945
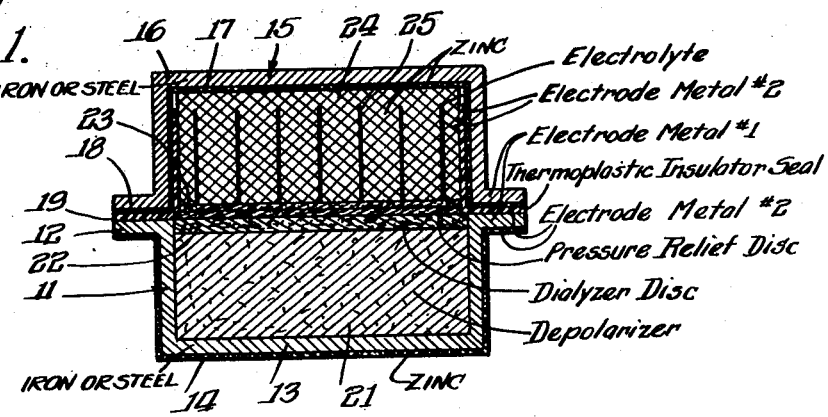
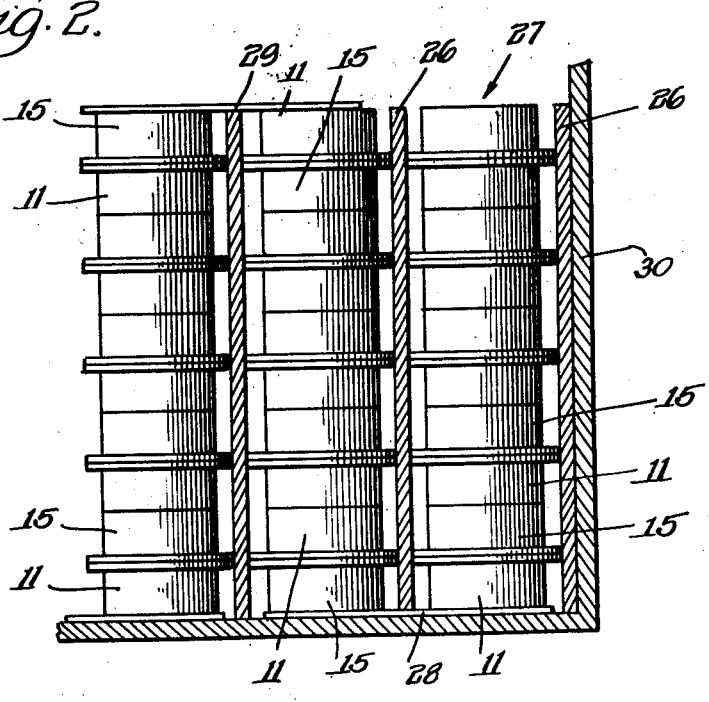
INVENTOR.
Judson West Jr.
Edwin S. Pridham
By:- Loftus, Moore, Olson & Trexler
attys.

Patented Oct. 17, 1950

2,526,101

UNITED STATES PATENT OFFICE 2,526,101

PRIMARY DRY CELL

Judson West, Jr., and Edwin S. Pridham, Fort Wayne, Ind., assignors to The Magnavox Company, Fort Wayne, Ind., a corporation of Delaware Application March 16, 1945, Serial No. 583,024

4 Claims. (Cl. 136—107)

The present invention relates to electric primary cells and more particularly to a primary dry cell of the type suited for assembly of a number of cells into a higher voltage battery.

In electric primary cells of the dry cell type it has been recognized that it is desirable to provide a vapor and electrolyte proof sealed cell structure. Dry cells of the type commonly used for flash lights have been provided with outer casings which prevent any leakage of the cell even though the life of the cell has reached its end. In multi-cell batteries, as in the case of B batteries, the emphasis has been upon compactness although it is also desirable to provide an arrangement whereby the exhausted cells produce a minimum of leakage and resultant deterioration of the surrounding equipment.

In accordance with the present invention it is possible to obtain primary dry cells for multi-cell batteries such as B batteries which are sealed so as to be vapor and electrolyte proof. The individual cells are formed by providing a casing of a sheet metal composed of two portions sealed by an insulating compound interposed between cooperating surfaces.

It, therefore, is an object of the present invention to provide an improved primary dry cell battery adapted to the assembly of a plurality of cells into a higher voltage battery.

A further object of the present invention is to provide an improved dry cell which is sealed so as to be vapor and electrolyte proof.

A still further object of the present invention is to provide a primary dry cell having an electrolyte proof casing which is relatively simple and economical to manufacture.

Other and further objects of the present invention subsequently will become apparent by reference to the following description taken in connection with the accompanying drawing wherein Figure 1 is a cross sectional view of an electric primary dry cell constructed in accordance with the present invention; and Figure 2 illustrates the manner in which a plurality of cells may be combined in the construction of a battery.

A primary dry cell constructed in accordance with the present invention is disclosed in Figure 1 wherein an outer casing is formed of two similar cup-shaped members. Each cup-shaped member is formed of a sheet of material having two layers of different metal, each metal being similar to but not functioning as an active electrode metal of the dry cell. The two cup-shaped members are sealed adjacent their edges to provide a vapor and electrolyte proof container. The lower half of the container comprises a cup-shaped member 11 which may have a peripheral flange 12. The member 11 is formed of a sheet of material having two layers of metal such as a layer 13, which may be of iron or steel, and the layer 14 which may be zinc. While zinc and iron or steel have been mentioned to illustrate the use of a material having two layers of dissimilar metals other metals may be used.

The sheet may be formed either in the manner commonly used in forming bi-metallic strips, or by plating, galvanizing, or spraying a metal sheet so that two dissimilar metals are bonded together. For economy in manufacturing the sheets preferably are so prepared as to comprise two dissimilar metals bonded together with such security as to permit punching and shaping to form a casing similar to that shown. The lower cup-shaped casing 11 therefore has iron on its inner surface and zinc on its outer surface. A similar cup-shaped member 15 is provided for the top half of the cell and has an outer layer 16 of iron and an inner layer 17 of zinc where the lower cup 11 has layers of iron and zinc. The upper cup 15 also is provided with a peripheral flange 18 so that the two flanges may be sealed by a thermoplastic insulator cement 19. As shown in Figure 1 the cement 19 may extend upwardly an appreciable distance within the sides of the upper cup member 15. The lower cup 11 is filled with a depolarizer mass 21 which is covered with a dialyzer disk 22. Immediately above the dialyzer disk 22 there are positioned one or more pressure relief disks 23 which may comprise a plurality of paper disks, the purpose of which subsequently will become apparent. The upper cup 15 is filled with an electrode body 24 which may comprise a rolled spiral of zinc, a solid zinc slug or compressed powdered zinc, Figure 1 illustrating the solid zinc slug. The electrode 24 is preferably amalgamated with mercury to permit readily available zinc ions to come into contact with the electrolyte 25 but to prevent local action, in a manner well known to those skilled in the art. Where a rolled spiral of zinc is used the spaces therebetween may be filled with electrolyte. Sufficient electrolyte is provided for the cell in accordance with the calculated proper electrical output with respect to the zinc and the depolarizer oxide provided, this depolarizer oxide functioning as both a depolarizer and a cathode. Good results may be obtained by using mercuric oxide as the depolarizer material with a caustic electrolyte comprising potassium hydroxide, water and zinc oxide.

The upper and lower parts of the outer casing when filled as described are placed so that the rims or flanges 12 and 18 are in alignment with the thermoplastic insulator or sealing material 19 therebetween. The thermoplastic layer or insulator 19 may comprise a layer of polystyrene, neoprene, or polyethylene to provide a cement coating having the characteristics of an excellent bonding property, great mechanical strength, and an inertness to the influence of the electrolytes used. The particular type of cement used depends upon the materials used in the cell structure including the electrode metals and the electrolyte. The primary requisite, however, is that the layer 19 be such as to provide a good bond between the upper and lower cup-shaped portions of the outer casing so as to produce an inert vapor and electrolyte proof seal. Thermoplastic insulating materials of certain types have been found satisfactory for this purpose. Where such materials are used, the outer edges or rims 12 and 18 when placed together are subjected to the proper amount of heat to bring about sealing action.

Figure 2 illustrates the manner in which a plurality of cells each having an outer casing formed in the manner shown in Figure 1 may be assembled in a series of stacks to form a high voltage battery. An outer carton 30 may be provided with liner and partition walls 26 to form a plurality of elongated cubicles each of which is to contain a stack 27 of cells to provide the requisite voltage for the battery. In the right hand stack 27 shown in Figure 2 the cells are stacked so that the half of the casing 15 which has the iron surface is on top, and the other half of the casing 11 which has a zinc coating is on the bottom. Thus the cells are arranged so that the zinc coated portion of one cell contacts the iron surface portion of the next cell. At the bottom of the right hand stack 27 there is provided a connecting strap 28 to provide an electrical connection between two adjacent stacks. In the next stack the position of all of the cells is reversed with respect to the position of the cells in the first stack. Thus in the second stack the iron surface portion of the cell is on the bottom with the zinc coated surface portion on the top. At the top of the second stack the zinc coated portion of the casing is connected by another connecting strap or bus-bar 29 to the third stack wherein the cells again are arranged in the same manner as in the first stack with the iron surface on top and the zinc surface on the bottom of each cell. Such an arrangement provides a compact structure having a minimum length of connecting strap or lid between cells. While the spaces between the partitions in the cells may be filled with some sort of compound, it is not necessary for the type of cell shown and described since each cell is individually sealed so as to be vapor and electrolyte proof. The large contact area of each stack with respect to the inner interconnecting strap or busbar is sufficient to obviate the necessity for soldering. Thus the structure further facilitates economical manufacture and assembly.

While the lower cup-shaped cell member 11 has been shown as having an exterior surface coated with zinc, such coating is not indispensable although preferable from a manufacturing standpoint. The zinc coating provides a means for readily identifying the polarity of each cell and also offers a softer metal surface for providing a firm contact between cells arranged in stacks. Each of the cells has been shown as being formed of two similar cup-shaped members having peripheral flanges, but it is to be understood that other shapes might be employed and that other configurations may be utilized at the juncture of the edges of two portions of the cell casing. Furthermore while certain metals and materials have been specified to illustrate the present invention, other types of metals and other kinds of electrolytes and cell compounds may be employed while still utilizing the principles of construction defining the present invention as set forth in the following claims.

This invention is hereby claimed as follows:

1. In a primary dry cell the combination of a depolarizing electrode body and a negative electrode separated by a dialyzer member and a pressure relief member, together with an electrolyte to energize the electrodes and a casing consisting of two oppositely disposed cup shaped members, one of said members containing the depolarizing electrode, said one member having an inside surface of metal which is chemically inactive with respect to said electrode; the other cup shaped member containing the negative electrode, said other member having an interior surface of metal which is chemically inactive with respect to the metal of the negative electrode; and insulating means sealing the marginal edges of said cup shaped members to each other.

2. In a primary dry cell, the combination of an imperforate container comprising a pair of shells sealed to each other, with one shell having an interior zinc surface and the other having an interior surface of ferrous metal; an anode consisting of a zinc slug; said slug being contained within the container, with the anode in surface contact with the shell having the interior zinc surface; a depolarizer contained within the other shell and in surface contact therewith; and an electrolyte in the cell.

3. In a primary dry cell, the combination of an imperforate container comprising a pair of similarly shaped and oppositely oriented shells sealed to each other, with one shell having an interior zinc surface and the other having an interior surface of ferrous metal; an anode within the container and consisting of a zinc slug positioned within the zinc surfaced shell, with the anode in surface contact with the zinc; a cathode including a depolarizer contained within the other shell, and an electrolyte in the cell; with at least one expansion layer between the anode and cathode.

4. In a primary dry cell, the combination of an imperforate container comprising a pair of similarly shaped and oppositely oriented shells sealed to each other, with one shell having an interior zinc surface and the other having an interior surface of ferrous metal; an anode consisting of a zinc slug contained within the said one shell, with the anode in surface contact with the interior zinc, a cathode including a depolarizer contained within the other shell, and in surface contact therewith; an electrolyte in the cell, a dialyzer layer between the anode and the depolarizer, and at least one pressure relief layer positioned between the anode and the dialyzer layer.

JUDSON WEST, Jr.
EDWIN S. PRIDHAM.

REFERENCES CITED

The following references are of record in the file of this patent:

UNITED STATES PATENTS

| Number | Name | Date |
|---|---|---|
| 1,015,735 | Heuser | Jan. 23, 1912 |
| 1,331,456 | Ellis | Feb. 17, 1920 |
| 1,468,574 | Parker | Sept. 18, 1923 |
| 1,568,927 | Stone et al. | Jan. 5, 1926 |
| 1,611,153 | Benner et al. | Dec. 21, 1926 |
| 2,307,627 | Lawson | Jan. 5, 1943 |
| 2,422,045 | Ruben | June 10, 1947 |
| 2,422,046 | Ruben | June 10, 1947 |
| 2,462,998 | Ruben | Mar. 1, 1949 |
| 2,463,316 | Ruben | Mar. 1, 1949 |

FOREIGN PATENTS

| Number | Country | Date |
|---|---|---|
| 60,860 | Germany | Feb. 1, 1892 |